March 17, 1953 P. W. MALLOY 2,631,811
SEAL FOR MULTIPORT ROTARY DISK VALVES
Filed Feb. 6, 1951 2 SHEETS—SHEET 1
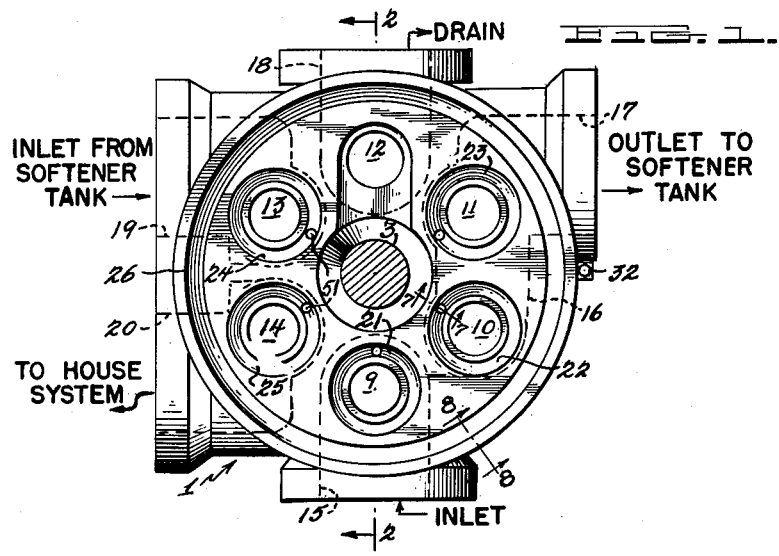
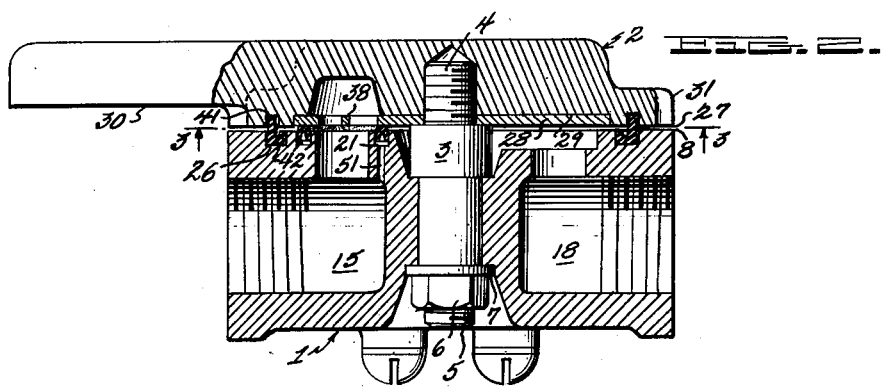
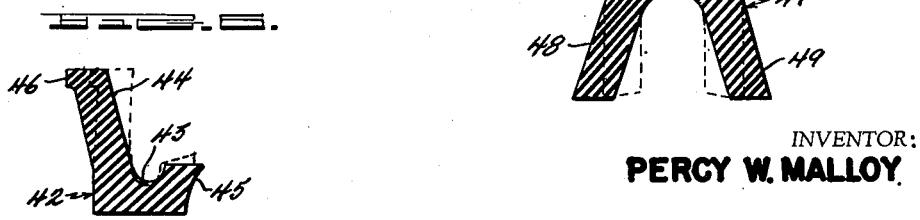
INVENTOR:
PERCY W. MALLOY
BY
Stone, Boyden & Mack
ATTORNEYS March 17, 1953 P. W. MALLOY 2,631,811
SEAL FOR MULTIPORT ROTARY DISK VALVES
Filed Feb. 6, 1951 2 SHEETS—SHEET 2
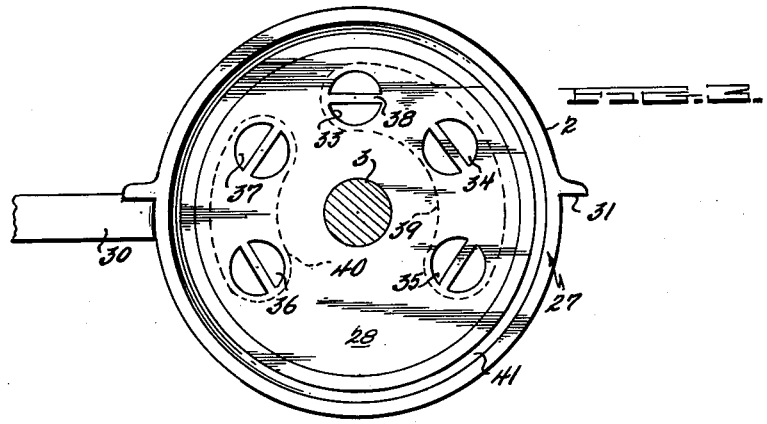
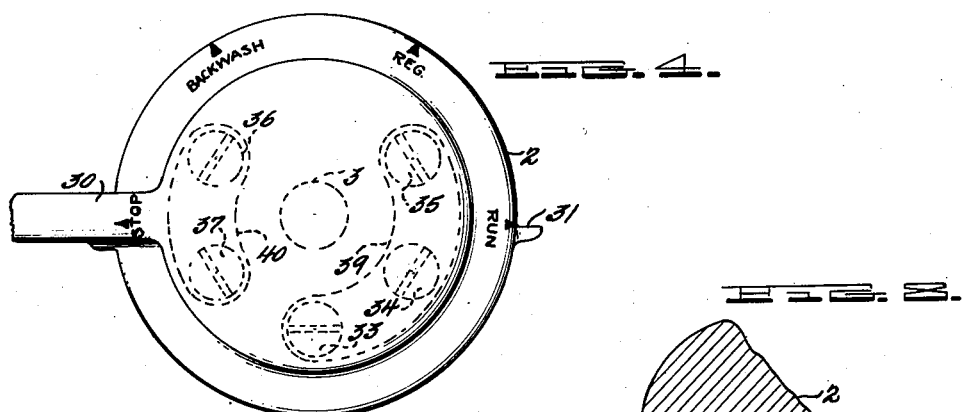
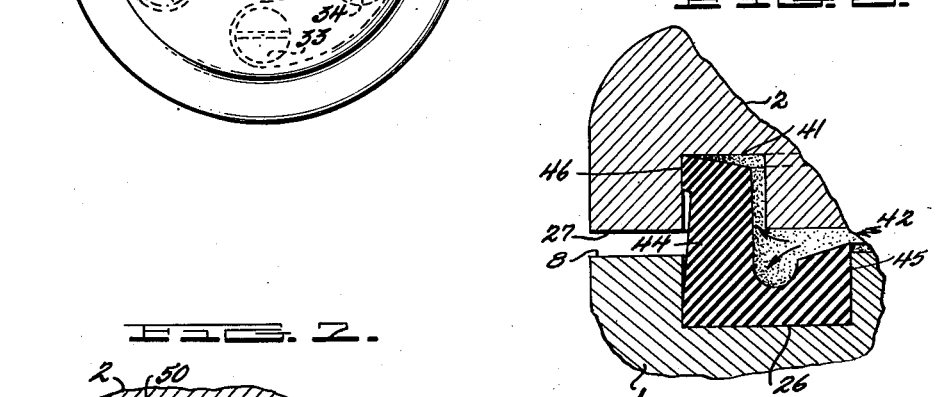
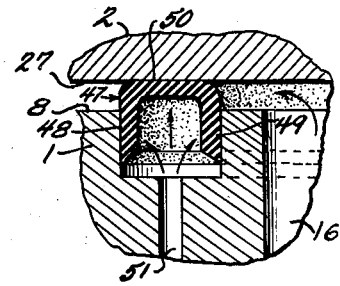
INVENTOR;
PERCY W. MALLOY.
BY Stone, Boyden + Mack
ATTORNEYS.

Patented Mar. 17, 1953

2,631,811

UNITED STATES PATENT OFFICE 2,631,811

SEAL FOR MULTIPORT ROTARY DISK VALVES

Percy W. Malloy, Madison, Wis., assignor of one-fourth to Philip W. Rosten and one-fourth to Randolph T. Rosten, both of Madison, Wis.

Application February 6, 1951, Serial No. 209,663

7 Claims. (Cl. 251—86)

1

This invention relates to valves and particularly to valves of the type including a stator having a face provided with a fluid conducting port, and a rotor having a face opposed to the face of the stator and provided with a fluid conducting port which can be brought into registry with the port of the stator by turning the rotor.

Such valves usually include a plurality of ports in the stator and the rotor so arranged that, by selecting the rotational position of the rotor, fluid from one or more of the stator ports can be conducted through the rotor selectively to the other ports of the stator. Usually referred to as multiple port rotary valves, such devices are particularly useful in controlling the flow of water in domestic water softening systems.

When valves of this type have been employed in the prior art, they have not been entirely successful because of difficulties encountered in sealing the space between the faces of the stator and rotor. It has usually been the practice to employ an annular flexible gasket surrounding each port, and another larger annular flexible gasket surrounding the entire port assembly of the valve, sufficient pressure being applied to the gaskets by the stator and rotor faces to obtain a seal. This arrangement has the disadvantage that the force applied to the gaskets necessary to obtain a seal is so great that it is not only difficult to turn the valve rotor, but it is also difficult to prevent the faces of the gaskets from wearing away as a result of friction as the rotor is turned.

The present invention overcomes these difficulties of the prior art by employing a novel arrangement of floating gaskets for the valve ports, whereby only some of the port gaskets are brought to bear forcibly against the rotor face at any one time during adjustment, and the frictional resistance to turning the rotor, as well as the attendant wear on the gaskets, is therefore reduced.

A further feature of the invention is the provision of a novel outer or peripheral sealing gasket for multiple port, disc type rotary valves.

Yet another feature of the invention is provision in a valve of the type referred to of a gasket arrangement characterized by greatly improved efficiency and greater simplicity than has heretofore been possible.

A still further feature of the invention is the provision, in a rotary multiple port valve including floating port gaskets, of novel means for preventing the port gaskets from being displaced laterally as the rotor of the valve is turned during adjustment.

2

In order that these and other features of the invention may be understood in detail, reference is made to the accompanying drawings which form a part of this specification and wherein:

Fig. 1 is a plan view of a valve constructed in accordance with one embodiment of the invention, with the rotor thereof removed;

Fig. 2 is a vertical sectional view taken on the line 2—2, Fig. 1;

Fig. 3 is a horizontal sectional view taken on the line 3—3, Fig. 2;

Fig. 4 is a top or plan view of the rotor employed in the valve shown in Fig. 1;

Fig. 5 is a vertical sectional view showing the cross-section of one of the port gaskets employed in the valve illustrated in Fig. 1;

Fig. 6 is a vertical sectional view showing the cross-section of the outer or peripheral sealing gasket employed in the valve of Fig. 1;

Fig. 7 is a detailed vertical sectional view taken on the line 7—7, Fig. 1; and

Fig. 8 is a detailed vertical sectional view taken on the line 8—8, Fig. 1.

Referring now to the drawings in detail, it will be seen from Figs. 1–4 that the valve there shown comprises a stator 1 and a rotor 2, the latter being rotatably mounted on the stator by means of a shaft 3 which is threaded at one end 4 into the rotor and extends completely through a central bore in the stator, being threaded at its other end 5 and there provided with a suitable securing nut 6 and sealing washer 7.

The stator 1 has a planar face 8 lying at right angles to the shaft 3 and in which are provided the fluid conducting ports 9—14. Fluid passages 15 and 17—20 are provided in the stator 1, communicating with the ports 9 and 11—14, respectively. Also, a branch passage 16 is arranged for communication between the port 10 and the passage 17. Centered about the ports 9, 10, 11, 13 and 14 are annular grooves or channels 21—25, respectively, in the face 8 of the stator, and there is also provided in the face 8 an outer annular groove or channel 26 which surrounds the entire working space between the stator and the rotor.

As seen in Figs. 2 and 3, the rotor 2 has a planar face 27 constituted partly by the main body of the rotor and partly by a circular plate 28 inserted into a central recess 29 in the rotor. The rotor is provided with a handle 30, by which it may be turned, and a stop lug 31 arranged to cooperate with a stop pin 32 on the stator.

The plate 28 includes a plurality of ports 33—37, each traversed by a centrally located bar, as at 38, all of the bars being approximately aligned on a circle centered on the shaft 3. The ports 33—37 may be provided in the plate 28 by punching or a like operation, and are so located in the plate that the ports 33—35 open into a fluid passage 39 in the body of the rotor, while the ports 36 and 37 open into a similar fluid passage 40. When the rotor is mounted on the stator as seen in Fig. 2 and is turned to the limit of its counterclockwise travel as determined by the stop lug 31 and the pin 32, then the ports 33—37 of the rotor are registered with the ports 9—11 and 13—14, respectively, of the stator. The embodiment of the valve illustrated is particularly adapted to the control of a water softening system, and in the adjusted position of the rotor just mentioned, water from the inlet passage 15 in the stator can flow through the ports 9 and 33 into the passage 39, through the ports 35 and 11 and the passage 17, thence out through suitable piping (not shown) to a water softening tank or other device, thence by suitable piping back to the passage 19, through the ports 13 and 37, the passage 40 in the rotor, and the ports 14 and 36 to the outlet passage 20 in the stator, which outlet passage may be connected to a domestic water system or other system in which the fluid used is to be controlled by the valve.

Fig. 4 shows three additional reference marks on the top of the rotor 2 which may be aligned with the stop pin 32, namely, a "regeneration" position in which the valve will simultaneously supply water from the inlet passage 15 to the outlet 20 via the rotor passage 39 and also supply water through the softening tank to the drain outlet 18 to regenerate the softener; a "backwash" position in which water is supplied directly to the outlet 20 as just described and is also flushed backward through the softener via the rotor passage 39, passage 19, the softener tank, and the drain 18, and an "off" position in which no flow through the valve is permitted. It is to be noted that, during adjustment of the valve to any of the positions mentioned, turning of the rotor brings the rotor ports into registry with selected ones of the stator ports to effect a particular controlling action, and the same principle is involved whether the valve is employed to control a water softening system or any other fluid system wherein a plurality of flow paths is required.

As is seen in Fig. 3, there is provided in the face 27 of the rotor 2 an annular channel or groove 41 which surrounds all of the rotor ports. When the rotor is mounted on the stator, as shown in Fig. 2, the outer edge of the groove 41 is approximately aligned with the outer edge of the groove 26 in the stator face 8. It will be noted that the groove 26, while it has approximately the same outer diameter as the groove 41, is considerably wider than is the groove 41. The two grooves cooperate with a flexible annular sealing gasket 42 of rubber, synthetic rubber or like material. The gasket 42, as will be seen from Figs. 6 and 8, includes a base portion 43 having a shallow substantially channel or U-shaped cross section, and has one of the webs of the base extended to form a sealing web or flange 44, so that the complete gasket has a cross-section which is approximately L-shaped. As illustrated by the solid lines in Fig. 6, the two webs 44 and 45 of the gasket flare outwardly when relaxed. On its outer surface, that is, the surface facing outside the circle of the gasket, the extended web 44 is provided with a sealing lip 46, the working face of which is at right angles to the plane of the gasket, as shown. In the assembled valve, as shown in Figs. 2 and 8, the base of the gasket 42 is seated in and compressed by the annular groove 26 in the face 8 of the valve stator. The longer web 44 of the gasket extends upwardly into the annular groove 41 in the face 27 of the rotor. Since the grooves 26 and 41 have their outer sides aligned, the sealing web 44 of the gasket is displaced toward the center of the circle of the gasket and, the gasket being of somewhat resilient material, the sealing lip 46 is thus urged into continuous engagement with the outer side of the groove 41, Fig. 8. The dotted lines in Fig. 6 represent the positions of the webs of the gasket as held in the assembled valve.

It will be understood that, as the rotor of the valve is turned, the space between the faces 8 and 27 enclosed by the annular gasket 42 is placed under fluid pressure. As illustrated by the arrows in Fig. 8, this pressure acts to hold the base of the gasket in firm sealing engagement with the channel 26 and also to urge the web 44 outwardly, so that the lip 46 is forced against the outer side of the groove 41 to form a fluid-tight seal. The efficiency of the seal formed by the gasket 42 of course increases as the fluid pressure in the space between the faces 8 and 27 increases. Since no portion of the gasket 42 is squeezed between the rotor and the stator, the gasket presents relatively little frictional resistance to turning of the rotor, as compared to the high resistance presented by the peripheral gaskets used in prior art rotary valves of this type.

Engaged in each of the grooves 21—25 is an annular floating gasket 47 of channel or U-shaped cross section, each gasket 47 being placed with its webs or skirts 48 and 49 extending into the groove in the stator and having its base 50 facing the face 27 of the rotor, as seen in Figs. 2 and 7. When relaxed, as illustrated by the solid lines of Fig. 5, the gasket 47, which again is of a suitable flexible material such as rubber or synthetic rubber, has its webs 48 and 49 flared outwardly, so that the gasket is put under compression when placed with its webs in the stator groove, as indicated by the dotted lines of Fig. 5. Each of the grooves 21—25 in the stator face is placed in communication with the fluid passage leading to the port surrounded by the groove by means of a conduit or bore 51, Figs. 2 and 7, extending through the stator body. Thus, when fluid pressure is applied to the passage 15 leading to the stator port 9, the same pressure is imparted through the bore 51 to the channel 21, and is therefore applied to the under surface of the gasket 47 as indicated by the arrows in Fig. 7. In effect, the gaskets 47 "float" in their corresponding annular grooves in the stator face. If no pressure is applied beneath gasket 47 through the bore 51, then the base 50 of the gasket is obviously not forced into positive engagement with the face 27 of the rotor, and therefore presents little or no frictional resistance to turning of the rotor. But, if fluid pressure is applied in the channel under the gasket 47, as occurs by reason of the bore 51 when pressure exists in the corresponding fluid passage in the stator, then the gasket is raised upwardly in its channel or groove until its base 50 is brought into positive sealing engagement with the face 27 of the rotor. The distance of travel of the floating gaskets 47 is of course determined by the spacing between the rotor face 27 and the stator face 8, and it will be understood that the webs or skirts 48 and 49 of the gaskets 47 must be longer than this spacing in order to keep the channels 21—25 sealed and under pressure. That is, when the base 50 of the gasket is forced against the rotor face 27, the skirts 48 and 49 must still extend well into the corresponding channel in the stator.

It is thus seen that, by provision of the floating gaskets 47, the present invention provides a multiple port rotary valve wherein only the gaskets for those ports leading from a fluid passage under pressure in the valve are forced into frictional engagement with the rotor.

It will be understood that, in such a structure, the floating gaskets 47 could be fairly easily pulled from their channels by any strong lateral pressure applied to the gasket, and that this difficulty increases when a more flexible material is used for the floating gasket, or when the gasket is made of especially thin material. For this reason it is desirable that the rotor ports 33—37 be provided with the bars 38 previously mentioned, these bars having their exposed faces flush with the face 27 of the rotor. These bars, being aligned approximately along a circle concentric with the center of rotation of the rotor, serve to prevent the edges of the rotor ports from catching the edges of the port gaskets 47 as the rotor is turned.

In operation of the valve illustrated herein, when the rotor 2 is adjusted to the "stop" or off position, that is, with the "stop" pointer on the rotor (Fig. 4) at the pin 32, Fig. 1, only the inlet chamber 15 will be under fluid pressure, and therefore only the port gasket in the channel 21 will be forced into contact with the rotor face. As the rotor is adjusted toward the "run" position, all of the chambers 16—17, 19 and 20 are progressively brought under pressure, and in the final "run" position, the floating gaskets for all of the ports 9—11, 13 and 14 are all forced into firm engagement with the rotor face.

I claim:

1. In a multiple port rotary valve, the combination of a stator having a face provided with a plurality of ports each communicating with a fluid passage in said stator; a rotor having a face opposed to and spaced from the face of said stator and including a plurality of ports each communicating with a fluid passage in said rotor and arranged for registry with the ports of said rotor, said stator being provided with a plurality of annular grooves in its face, each groove surrounding one of the ports in said face, said stator also including for each of said grooves a conduit communicating between the groove and the passage leading to the port surrounded thereby; a plurality of annular flexible channel shaped gaskets each positioned with its skirts embraced in one of said annular grooves, the skirts of each gasket being longer than the spacing between said faces; means mounting said rotor for rotation about an axis perpendicular to said faces, and an annular flexible gasket surrounding all of said ports and arranged to seal the space between said faces.

2. In a multiple port rotary valve, the combination of a stator having a face provided with a plurality of ports each communicating with a fluid passage in said stator; a rotor having a face opposed to but spaced from the face of said stator and including a plurality of ports each communicating with a fluid passage in said rotor and arranged for registry with the ports of said stator in selected positions of said rotor, said stator being provided with a plurality of annular grooves in its face, each groove surrounding one of the ports in said face, said stator also including for each of said grooves a conduit communicating between the groove and the passage leading to the port surrounded thereby, said stator also being provided with an outer annular groove surrounding the ports in said stator face, and said rotor being provided with an outer annular groove surrounding the ports in said rotor face and having its outer edge substantially aligned with the outer edge of said outer annular groove in said stator face; means mounting said rotor for rotation about an axis perpendicular to said faces; an annular flexible gasket having a generally L-shaped cross-section and being mounted with its base positioned in said outer groove of said stator and its web extending into the outer groove of said rotor and lying against the outer side thereof, whereby fluid pressure in the space between said faces will force said web into sealing engagement with the outer side of said outer groove of the rotor, and a plurality of annular flexible channel shaped gaskets each positioned with its skirts embraced in one of said first mentioned annular grooves in said stator, the skirts of each of said channel shaped gaskets being longer than the spacing between said faces.

3. In a multiple port rotary valve, the combination of a stator having a face provided with a plurality of ports each communicating with a fluid passage in said stator; a rotor having a face opposed to and spaced from the face of said stator and including a plurality of ports each communicating with a fluid passage in said rotor and arranged for registry with the ports of said stator in selected positions of said rotor, said stator being provided with a plurality of annular grooves in its face, each groove surrounding one of the ports in said stator face, said stator also including for each of said grooves a conduit communicating between the groove and the passage leading to the port surrounded thereby; said stator also being provided with an outer annular groove surrounding the ports in said stator face, and said rotor being provided with an outer annular groove surrounding the ports in said rotor face; means mounting said rotor for rotation about an axis perpendicular to said faces; an annular flexible gasket of generally U-shaped cross-section with the outer web extended beyond the inner web, said gasket having its base positioned in said outer groove of said stator and its outer web extending into the outer groove of said rotor and lying against the outer side thereof, whereby fluid pressure in the space between said faces will force said web into sealing engagement with the outer side of said outer rotor groove, and a plurality of annular flexible channel-shaped gaskets each positioned with its skirts extending into one of said first mentioned annular grooves in said stator, the skirts of each of said channel-shaped gaskets being longer than the spacing between said faces.

4. In a multiple port rotary valve, the combination of a stator having a face provided with a plurality of ports each communicating with a fluid passage in said stator; a rotor having a face opposed to and spaced from the face of said stator and including a plurality of ports each communicating with a fluid passage in said rotor and arranged for registry with the ports of said stator in selected positions of said rotor, said stator being provided with a plurality of annular grooves in its face, each groove surrounding one of the ports in said face, said stator also including for each of said grooves a conduit communicating between the groove and the passage leading to the port surrounded thereby; a plurality of annular flexible channel shaped gaskets each positioned with its skirts extending into one of said annular grooves, the skirts of each gasket being longer than the spacing between said faces; means mounting said rotor for rotation about an axis perpendicular to said faces, each port of said rotor being traversed by a bar having its exposed face flush with said rotor face and lying approximately along a circle concentric with the center of rotation of said rotor, and an annular flexible gasket surrounding all of said ports and arranged to seal the space between said faces.

5. In a rotary valve, the combination of a stator having a planar face and a fluid passage communicating with a port in said face; a rotor having a planar face and a fluid passage communicating with a port in said face, said rotor being mounted for rotation about an axis perpendicular to the plane of its face and said ports being so located that they may be brought into alignment by turning said rotor, the faces of said stator and rotor being parallel but spaced apart; gasket means surrounding one of said ports and constructed to establish a seal between said planar faces when said ports are not in alignment, and an outer annular flexible gasket surrounding said ports and positioned in continuous engagement between said stator and rotor to seal the space therebetween.

6. In a multiple port rotary valve, the combination of a stator member having a face provided with a plurality of ports each communicating with a fluid passage in said stator member, a rotor member having a face opposed to and spaced from the face of said stator member and including a plurality of ports each communicating with a fluid passage in said rotor member and arranged for registry with the ports of said stator in selected positions of said rotor member; a plurality of annular gasket means carried by one of said members and each surrounding one of said ports to establish a seal between said faces when said ports are not in registry; the faces of said stator member and said rotor member each being provided with an outer annular groove surrounding said ports, said grooves being centered about the axis of rotation of said rotor and aligned opposite each other; and an annular gasket co-operating with said grooves to seal the space between said faces, said gasket including a base seated in one of said grooves and a flexible web extending from said base across the space between said faces and into the one of said grooves opposite said base, whereby fluid pressure in the space between said faces will force said web into sealing engagement with the outer sides of said grooves.

7. In a rotary valve, the combination of a stator having a planar face and a fluid passage communicating with a port in said face; a rotor having a planar face and a fluid passage communicating with a port in said face, said rotor being mounted for rotation about an axis perpendicular to the plane of its face and said ports being so located that they may be brought into alignment by turning said rotor, the faces of said stator and rotor being parallel but spaced apart; gasket means surrounding one of said ports and constructed to establish a seal between said planar faces when said ports are not in alignment; the faces of said stator and rotor each being provided with an outer annular groove surrounding said ports, said grooves being centered about the axis of rotation of said rotor and aligned opposite each other; and a flexible annular gasket cooperating with said grooves to seal the space between said faces, said gasket having a base of shallow channel cross section, the webs thereof normally flaring outwardly and the outer web being extended beyond the inner web, said outer web being provided on its outer face with an outwardly facing sealing lip, said base of said gasket being seated under compression in one of said grooves and said outer web of said gasket extending across the space between the planar faces of said stator and rotor with said sealing lip engaging the outer wall of the other of said grooves.

PERCY W. MALLOY.

REFERENCES CITED

The following references are of record in the file of this patent:

UNITED STATES PATENTS

| Number | Name | Date |
|---|---|---|
| 1,931,733 | Leibing | Oct. 24, 1933 |
| 2,214,194 | Frankley | Sept. 10, 1940 |
| 2,229,932 | Parker | Jan. 28, 1941 |
| 2,299,802 | Daniels | Oct. 27, 1942 |
| 2,373,463 | Curtis | Apr. 10, 1945 |